E. F. GIBBONS.
FODDER SHREDDER.
APPLICATION FILED MAR. 15, 1905.

914,136.  Patented Mar. 2, 1909.

Witnesses.

Inventor:
E. F. Gibbons.

UNITED STATES PATENT OFFICE.

EDWARD F. GIBBONS, OF SALEM, OHIO.

FODDER-SHREDDER.

No. 914,136.   Specification of Letters Patent.   Patented March 2, 1909.

Application filed March 15, 1905. Serial No. 250,241.

*To all whom it may concern:*

Be it known that I, EDWARD F. GIBBONS, a citizen of the United States of America, residing at Salem, in the county of Columbiana and State of Ohio, have invented certain new and useful Improvements in Fodder-Shredders, of which the following is a specification, reference being had therein to the accompanying drawing.

This invention relates to certain new and useful improvements in feed cutters or fodder shredders, and relates particularly to the blade which performs the cutting or shredding operation.

Heretofore, and before my invention, it has generally been the practice to employ a multiplicity of separately attached bits, or small blades or teeth to perform the shredding operation. Instead of this, I employ a solid blade with a plurality of integral projecting bits, which I have found will shred the fodder in a superior and cheaper manner than the independent separately attached bits or blades.

In describing the invention in detail, reference is had to the accompanying drawings, forming a part of this application, and wherein like numerals of reference indicate like parts throughout the several views, in which:—

Figure 1:
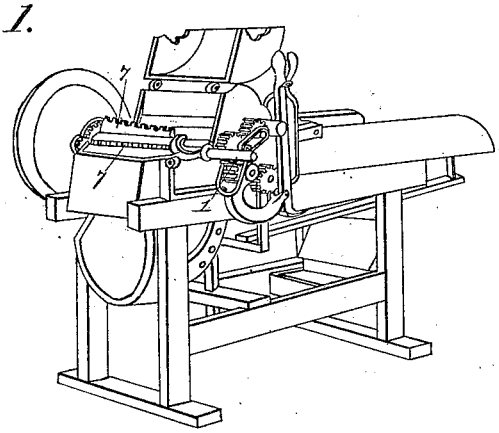
Figure 2:
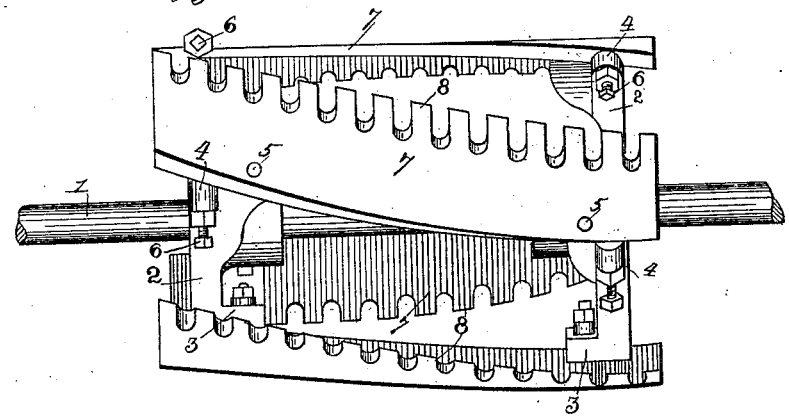

Figure 1, is a detail perspective view of an approved form of fodder shredder with my improved blades therein. Fig. 2, is a detached enlarged view of the cutter, showing a plurality of the blades, the drive shaft being broken away.

As the frame of the machine, as well as all other parts of the machine, is the same as an approved form of fodder shredder now in use, I will not describe the same in detail, confining my description to the feature of the blades and the manner of mounting the same which constitute the present invention.

On the drive shaft 1, are mounted hubs or spiders 2, rigidly affixed to the shaft or spindle so as to revolve therewith. These hubs or spiders are constructed with laterally projecting lugs 3, and radial lugs 4, bolts 5 being passed through the cutting blades and the lugs 3, for the purpose of securing the blades thereto, the rear ends of the blades engaging with the radial lugs 4, which lugs carry screws 6 by means of which the blades may be adjusted.

The cutting or shredding blades 7 are each made in one piece, and are provided along the cutting or knife edge with a series of cutting bits 7 made integral with the body of the blade. These blades are curved both longitudinally and transversely, and are attached to the hubs or spiders at an angle to the longitudinal axis of the shaft 1, whereby the cutting bits or shredders of each blade successively engage with the fodder as the latter is fed into position to be shredded. The transverse curvature given to the blades permits of their producing, not essentially a finer product, but at least the same results as heretofore obtained by the multiplicity of bits and with more practical construction, less power and speed being required in operating a machine supplied with my improvements and a safer method of construction and great ease in adjustment, grinding, etc., being secured.

It will be noted that various changes may be made in the details of construction without departing from the general spirit of my invention.

Having fully described my invention, what I claim as new and desire to secure by Letters Patent, is:—

In a fodder shredder, the combination with a shaft and spiders carried by said shaft, said spiders provided with lateral and radial lugs, of a plurality of blades connected to said lateral lugs and arranged at an angle to the longitudinal axis of the shaft, each of such blades being curved from edge to edge and curved from end to end, said blades being of uniform thickness throughout and provided with one knife edge, said knife edge portion provided with spaced recesses having parallel sides, whereby a plurality of spaced cutting bits are formed with their cutting edges curved to correspond to the longitudinal curvature of the blade, and the bits extending in a plane with the blades, and means carried by the radial lugs and engaging the blades for adjusting them.

In testimony whereof I affix my signature in the presence of two witnesses.

EDWARD F. GIBBONS.

Witnesses:
T. E. WEBB,
P. B. TUCKER.